(12) United States Patent
Marriott et al.

(10) Patent No.: US 8,752,519 B2
(45) Date of Patent: Jun. 17, 2014

(54) AIR ASSIST START STOP METHODS AND SYSTEMS

(75) Inventors: Craig D. Marriott, Clawson, MI (US); Hamid Vahabzadeh, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1218 days.

(21) Appl. No.: 12/638,131

(22) Filed: Dec. 15, 2009

(65) Prior Publication Data

US 2011/0144894 A1   Jun. 16, 2011

(51) Int. Cl.
   *F02N 11/08* (2006.01)

(52) U.S. Cl.
   USPC .................................. 123/179.3; 701/113

(58) Field of Classification Search
   USPC .............. 123/179.1, 179.3, 179.19, 179.22, 123/179.31, 182.1, 321, 323, 324, 327; 60/606; 701/113
   See application file for complete search history.

(56) References Cited

U.S. PATENT DOCUMENTS

| | | | |
|---|---|---|---|
| 2,595,281 A | 5/1952 | Miller | |
| 4,981,119 A * | 1/1991 | Neitz et al. | 123/321 |
| 5,315,974 A * | 5/1994 | Sabelstrom et al. | 123/320 |
| 5,404,852 A * | 4/1995 | Frankle | 123/321 |
| 5,497,746 A * | 3/1996 | Semence et al. | 123/339.27 |
| 6,125,808 A | 10/2000 | Timewell | |
| 6,373,206 B1 * | 4/2002 | Morimoto et al. | 318/139 |
| 6,935,295 B2 * | 8/2005 | Marriott | 123/179.5 |
| 7,370,630 B2 * | 5/2008 | Turner et al. | 123/299 |
| 8,131,453 B2 * | 3/2012 | Ulrey et al. | 701/112 |
| 8,347,624 B2 * | 1/2013 | Pursifull et al. | 60/598 |
| 8,439,002 B2 * | 5/2013 | Pursifull et al. | 123/21 |
| 2003/0233999 A1 * | 12/2003 | Anderson | 123/316 |
| 2008/0216779 A1 | 9/2008 | Watanabe et al. | |

FOREIGN PATENT DOCUMENTS

| | | |
|---|---|---|
| CN | 101260837 A | 10/2008 |
| CN | 101545441 A | 9/2009 |

* cited by examiner

*Primary Examiner* — Stephen K Cronin
*Assistant Examiner* — Joseph Dallo
(74) *Attorney, Agent, or Firm* — Cantor Colburn LLP

(57) ABSTRACT

In one exemplary embodiment of the present invention, a method of controlling an engine having a plurality of cylinders is provided. The method includes: selectively releasing stored air from an accumulator to a first cylinder of the plurality of cylinders; and controlling at least one of fuel and spark to a second cylinder of the plurality of cylinders during a compression stroke of the second cylinder, where the second cylinder is a next available cylinder to fire.

19 Claims, 3 Drawing Sheets

AIR ASSIST START STOP METHODS AND SYSTEMS

FIELD OF THE INVENTION

Exemplary embodiments of the invention are related to engine systems and, more specifically, to methods and systems for starting and stopping an engine.

BACKGROUND

Internal combustion engines, in some cases, commence operation by way of an electric starter motor and a battery. The battery provides high power (e.g., 200-600 amperes of current) to the electric starter motor. Using the power, the electric motor turns or cranks the engine.

Such a starting system provides added cost to the engine system. Moreover, such starting operations can produce wear on the engine. Thus, it is desirable to be able to start an internal combustion engine without the use of the starter motor and battery.

SUMMARY OF THE INVENTION

In one exemplary embodiment of the present invention, a method of controlling an engine having a plurality of cylinders is provided. The method includes: selectively releasing stored air from an accumulator to a first cylinder of the plurality of cylinders; and controlling at least one of fuel and spark to a second cylinder of the plurality of cylinders during a compression stroke of the second cylinder, where the second cylinder is a next available cylinder to fire.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
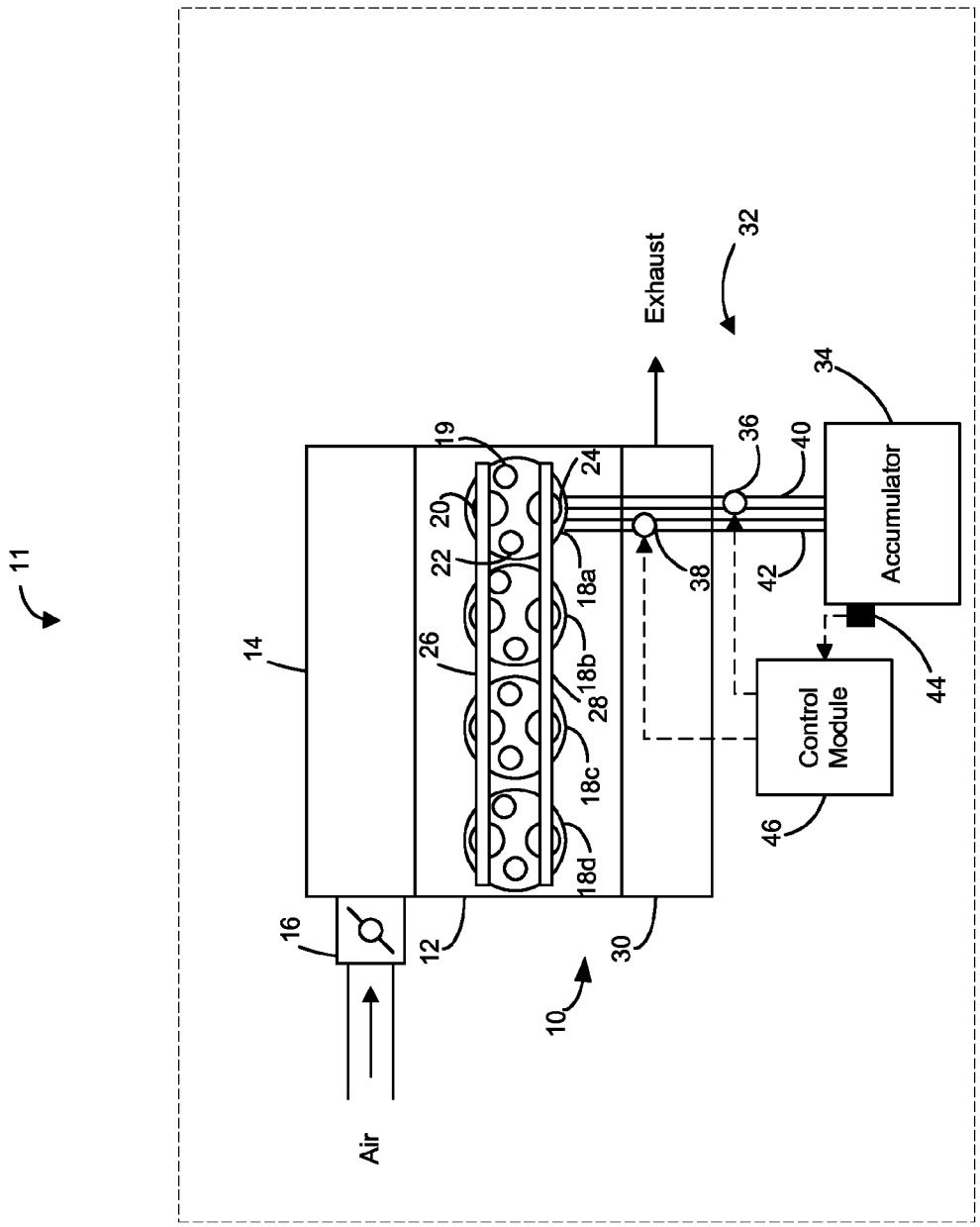
FIG. 1 is a functional block diagram illustrating an engine system that includes an engine start/stop system in accordance with an exemplary embodiment.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a block diagram illustrates an exemplary engine system 10 of a vehicle 11 that includes an engine start/stop system in accordance with an exemplary embodiment. The engine system 10 includes an engine 12 that combusts an air and fuel mixture to produce drive torque. The illustrated engine 12 is a four stroke internal combustion engine that operates the cylinders according to an intake stroke, a compression stroke, an expansion stroke, and an exhaust stroke. As can be appreciated, the engine start/stop system is applicable to various internal combustion engine configurations and is not limited to the present example.

In the example engine system 10 shown in FIG. 1, during operation of the engine 12, air is drawn into an intake manifold 14 through a throttle 16. The throttle 16 regulates mass airflow into the intake manifold 14. Air within the intake manifold 14 is distributed into cylinders 18a-18d. Although four cylinders 18a-18d are illustrated, it can be appreciated that the engine start/stop system of the present disclosure can be implemented in engines 12 having a plurality of cylinders including, but not limited to, 2, 3, 4, 5, 6, 8, 10 and 12 cylinders.

Each cylinder 18a-18d is associated with a fuel injector 19, an intake valve 20, an exhaust valve 24, and optionally a spark plug 22. For example, the fuel injector 19 injects fuel into the cylinder 18a (e.g., direct injection). The fuel is combined with the air that is drawn into the cylinder 18a through an intake port. The fuel injector 19 may be an injector associated with an electronic or mechanical fuel injection system, a jet or port of a carburetor or another system for mixing fuel with intake air. The fuel injector 19 is controlled to provide a desired air-to-fuel (A/F) ratio within the cylinder 18a. In various other embodiments, the engine 12 is a lean operating engine where the fuel injector 19 is controlled to provide a desired fuel quantity within the cylinder 18a.

The intake valve 20 selectively opens and closes to enable the air to enter the cylinder 18a. The intake valve position is regulated by an intake camshaft 26. A piston (not shown) compresses the air/fuel mixture within the cylinder 18a. In various embodiments, the spark plug 22 initiates combustion of the air/fuel mixture, which drives the piston in the cylinder 18a. The piston, in turn, drives a crankshaft (not shown) to produce drive torque. Combustion exhaust within the cylinder 18a is forced out an exhaust port when the exhaust valve 24 is in an open position. The exhaust valve position is regulated by an exhaust camshaft 28. The exhaust exits the engine 12 through an exhaust manifold 30, is treated in an exhaust system (not shown), and is released to atmosphere.

To commence operation of the engine 12, an engine start/stop system 32 according to the present disclosure is provided. The engine start/stop system 32 includes an accumulator 34, and one or more valves 36, 38 and is associated with a single cylinder 18a, 18b, 18c, or 18d (hereinafter referred to as cylinder 18) of the engine 12. In various embodiments, the one or more valves 36, 38 are disposed between the first engine cylinder 18a and the accumulator 34 along one or more conduits 40, 42. As can be appreciated, the engine start/stop system 32 can be associated with any one of the cylinders 18 of the engine 12 and is not limited to the present example.

In the example of FIG. 1, a pressure control valve 36 is selectively controlled to charge the accumulator 34 with pressure from the first cylinder 18a. In various embodiments, the pressure control valve 36 is a passive check valve. A pressure release valve 38 is selectively controlled to release the stored pressure in the accumulator 34 to the first cylinder 18a. In various embodiments, the pressure release valve 38 is an active control valve (i.e., a spark ignition direct injection (SIDI) injector type valve). A pressure sensor 44 senses the pressure within the accumulator 34 and generates a pressure signal based thereon.

A control module 46 receives the pressure signal and various other engine sensor signals and controls the engine 12 and the engine start/stop system 32 based thereon. Generally speaking the control module 46 manages the storage and release of the pressure in the accumulator 34 and controls the starting and the stopping of the engine 12 based on the managed pressure.

Figure 2:
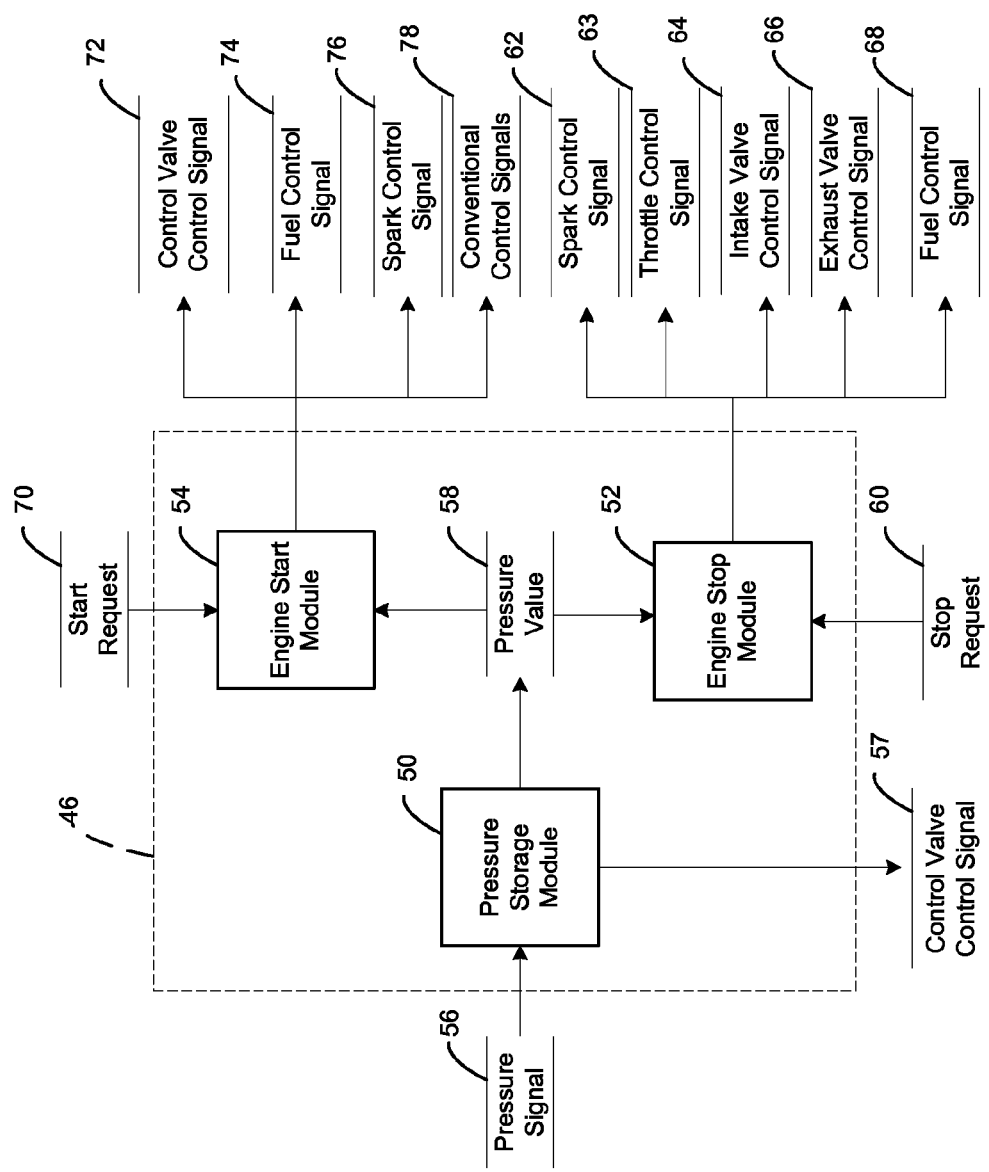
FIG. 2 is a dataflow diagram illustrating a control module of the engine system in accordance with an exemplary embodiment.

Referring now to FIG. 2, a dataflow diagram illustrates various embodiments of an engine start/stop control system that may be embedded within the control module 46. Various embodiments of the engine start/stop control systems according to the present disclosure may include any number of sub-modules and/or datastores embedded within the control module 46. As can be appreciated, the sub-modules shown in FIG. 2 can be combined and/or further partitioned to similarly control the engine system 10. Inputs to the control system may be sensed from the vehicle 11, received from other control modules (not shown) within the vehicle 11, and or determined by other sub-modules (not shown) with in the control module 46. In various embodiments, as shown in FIG. 2, the control module 46 includes a pressure storage module 50, an engine stop module 52, and an engine start module 54.

The pressure storage module 50 receives as input a pressure signal 56 generated by the pressure sensor 44 (FIG. 1). Based on the pressure signal 56, the pressure storage module 50 manages the amount of pressure within the accumulator 34 (FIG. 1). In one example, the pressure storage module 50 controls the pressure control valve 36 (FIG. 1) via a control valve control signal 57 to synchronously sample pressure released from the first cylinder 18*a* (FIG. 1) until the pressure signal 56 indicates that the pressure within the accumulator 34 (FIG. 1) has reached a predetermine threshold. The pressure storage module 50 generates a pressure value 58 indicating a current pressure level according to the pressure signal 56 and/or indicating whether the threshold pressure has been met.

The engine stop module 52 receives as input an engine stop request 60, and the pressure value 58. The engine stop request 60 may be generated based on one or more operating conditions of the engine system 10 (FIG. 1). In one example, the engine stop request 60 is generated based on driving scenarios of the engine 12, such as, for example, an extended idle condition without vehicle velocity. In various other examples, the engine stop request 60 is generated based on an ignition off request to turn off the vehicle 11 (FIG. 1).

Based on the engine stop request 60, the engine stop module 52 evaluates the pressure value 58. If the pressure value 58 indicates that the pressure level is sufficient to restart the engine 12 (FIG. 1), the engine stop module 52 generates one or more spark control signals 62, throttle control signals 63, intake valve control signals 64, exhaust valve control signals 66, and/or fuel control signals 68 to shut down the engine 12 (FIG. 1). In various embodiments, the engine stop module 52 generates the one or more signals 62-68 such that the cylinder associated with the engine start/stop system 32 (FIG. 1) stops in the expansion/power stroke. Provided the example of FIG. 1, the engine stop module 52 generates the one or more signals 62-68 such that the first cylinder 18*a* (FIG. 1) of the engine 12 (FIG. 1) stops in the expansion/power stroke.

If the pressure value 58 indicates that the pressure level is not yet sufficient to restart the engine 12 (FIG. 1), the stopping of the engine 12 (FIG. 1) is delayed until a sufficient pressure level has been met. In various embodiments, diagnostic methods can be performed on the engine start/stop system 32 (FIG. 1) to ensure that the pressure level can be met before delaying the stopping of the engine 12 (FIG. 1).

The engine start module 54 receives as input an engine start request 70, and the pressure value 58. The engine start request 70 may be generated based on one or more operating conditions of the engine system 10 (FIG. 1). In one example, the engine start request 70 is generated based on driving scenarios of the engine 12 (FIG. 1) and/or conditions of the vehicle, such as, for example, depression of a clutch pedal and/or release of a brake pedal. In various other examples, the engine start request 70 is generated based on an ignition on request to turn on the vehicle 11 (FIG. 1).

Based on the start request 70, the engine start module 54 evaluates the pressure value 58 to determine whether sufficient pressure is stored to start the engine 12 (FIG. 1). If the pressure value 58 indicates that the pressure level is sufficient to restart the engine 12 (FIG. 1), the engine start module 54 generates a control valve control signal 72 to selectively open and close the pressure release valve 38 (FIG. 1) to start the engine 12 (FIG. 1). In various embodiments, the engine start module 54 generates the control valve control signal 72 to open the pressure release valve 38 (FIG. 1) when an engine start is desired. The pressure release valve 38 (FIG. 1) is controlled in the open position to release the stored air in the accumulator 34 (FIG. 1) into the cylinder 18 (FIG. 1) to rotate the engine 12 (FIG. 1) through the next cylinder firing opportunity. Once the next firing opportunity occurs, the pressure release valve 38 (FIG. 1) is controlled in the closed position such that the accumulator 34 can be charged for the next start-stop event.

Based on the release of air into the cylinder 18 (FIG. 1), the engine start module 54 further controls the fuel injection and spark timing for the cylinder 18*c* (FIG. 1) in which the next firing opportunity will occur. In various embodiments, the engine start module 54 generates a fuel control signal 74 to control fuel to the cylinder 18*c* (FIG. 1) when the pressure release valve 38 (FIG. 1) is in the open position. The engine start module then, optionally, generates a spark control signal 76 to control spark in the cylinder 18 (FIG. 1) to ignite the fuel and air mixture. The timing of the spark can be according to conventional spark timing methods (i.e., at or near top dead center). The engine start module 54 generates subsequent fuel control signals 74 and spark control signals 76 such that the following cylinders 18*a*, 18*b*, and 18*d* are then fueled and ignited in the appropriate firing order to complete and sustain the starting process.

In one example, when the fist cylinder 18*a* (FIG. 1) is associated with the accumulator 34 (FIG. 1) and is stopped in the expansion/power stroke, the engine start module 54 generates the fuel control signal 74 such that fuel is injected into the third cylinder 18*c* (FIG. 1) (the next cylinder to fire) when the pressure release valve 38 (FIG. 1) is in the open position. The engine start module 54 then generates the spark control signal 76 to control spark to the third cylinder 18*c* (FIG. 1) in which the fuel was injected. The pressure release valve 38 (FIG. 1) is then controlled in the closed position such that the accumulator 34 can be charged for the next start-stop event.

If, however, the pressure value 58 indicates that the pressure level is not sufficient to restart the engine 12 (FIG. 1), the engine start module 54 restarts the engine 12 based on conventional starting methods (i.e., starter motor) via conventional controls signals 78.

Figure 3:
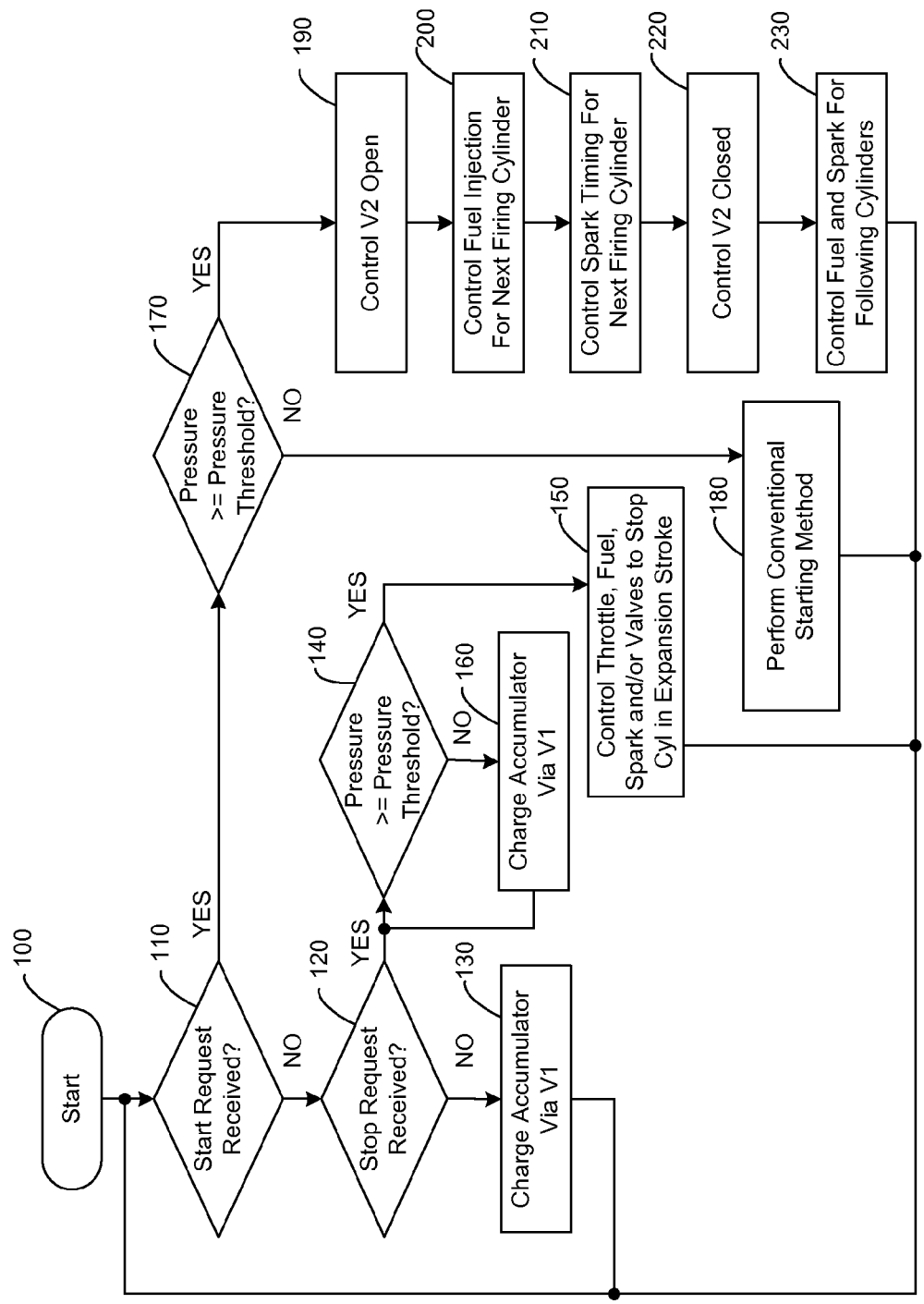
FIG. 3 is a flowchart illustrating an engine start/stop method in accordance with an exemplary embodiment.

Turning now to FIG. 3 and with continued reference to FIGS. 1 and 2, a flowchart illustrates an engine start/stop control method that can be performed by the control module 46 of FIG. 2 in accordance with various aspects of the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the vehicle 11.

In one example, the method may begin at 100. The engine operation requests 70, 60 are evaluated at 110 and 120. When the engine start request 70 is not received at 110 and the engine stop request 60 is not received at 120, the engine 12 is in operation. The accumulator 34 is charged with pressure from the cylinder 18 via the pressure control valve 36 (i.e., opening the pressure control valve 36) at 130. Thereafter, the method continues with monitoring the engine operation requests 70, 60 at 110 and 120.

When the engine start request 70 is not received at 110, however, the engine stop request 60 is received at 120, the pressure value 58 is evaluated at 140. If the pressure value 58 is greater than or equal to a predetermined pressure threshold at 140, the engine 12 is stopped at 150 such that the cylinder 18 associated with the accumulator 34 (the first cylinder 18a) is stopped in the expansion/power stroke. In various embodiments, the engine 12 is stopped in such a manner via one or more spark control signals 62, throttle control signals 63, valve control signals 64, 66, and fuel control signals 68. If, however, the pressure value 58 is less than the predetermined pressure threshold at 140, the stopping of the engine is delayed to allow the accumulator to continue to charge at 160 until sufficient pressure levels have been met at 140. Thereafter, the engine 12 is stopped at 150 and the method continues with monitoring the engine operation requests 70, 60 at 110 and 120.

When the engine start request 70 is received at 110, the pressure in the accumulator 34 is evaluated at 170. If the pressure in the accumulator 34 is greater than or equal to the pressure threshold at 170, the pressure in the accumulator 34 is used to restart the engine 12 at 190-230. However, at 170, if the pressure in the accumulator 34 is less than the pressure threshold, alternative methods of starting the engine 12 are performed at 180.

To restart the engine 12 via the stored pressure, the second valve (V2) 38 is controlled open at 190 to release the pressure into the cylinder 18 associated with the accumulator 34 (the first cylinder 18a). The fuel and spark for the next firing cylinder 18 (the third cylinder 18c) is controlled at 200 and 210 respectively. Once the spark event completes for that cylinder 18, the second valve (V2) 38 is controlled closed at 220. The fuel and spark for the following cylinders 18 (the first cylinder 18a, the second cylinder 18b, and the fourth cylinder 18d) are controlled at 230 to complete the starting of the engine 12. Thereafter, the method continues with monitoring the engine operation requests 70, 60 at 110 and 120.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of controlling an engine having a plurality of cylinders, the method comprising:
   releasing stored air from an accumulator to a first cylinder of the plurality of cylinders that is stopped in an expansion stroke in order to push the first cylinder until a second cylinder of the plurality of cylinders that is a next available cylinder to fire is fired; and
   controlling fuel and spark to the second cylinder during a compression stroke of the second cylinder while releasing the stored air to the first cylinder in order to fire the second cylinder.

2. The method of claim 1, wherein the stored air from the accumulator is released only to the first cylinder among the plurality of cylinders, and the air stored in the accumulator is from the first cylinder only.

3. The method of claim 2 further comprising controlling the engine to stop the first cylinder in the expansion stroke.

4. The method of claim 1 further comprising storing air from the first cylinder in the accumulator.

5. The method of claim 4 further comprising regulating the stored air in the accumulator based on a pressure threshold.

6. An engine control system for an engine system including an engine having a plurality of cylinders, the control system comprising:
   a first valve in fluid communication with a first cylinder of the engine; and
   an engine start module that starts the engine by controlling the first valve to release stored air from an accumulator to the first cylinder that is stopped at an expansion stroke in order to push the first cylinder until a second cylinder of the engine that is a next available cylinder to fire is fired and by controlling fuel and spark to the second cylinder during a compression stroke of the second cylinder while releasing the stored air to the first cylinder in order to fire the second cylinder.

7. The control system of claim 6, wherein the engine start module controls the first valve to stop releasing the stored air to the first cylinder when the second cylinder is fired in order to start accumulating air in the accumulator again.

8. The control system of claim 7 further comprising an engine stop module that controls the engine to stop the first cylinder in the expansion stroke when a pressure in the accumulator is greater than or equal to a pressure threshold and that controls the engine to delay stopping the first cylinder when the pressure in the accumulator is less than the pressure threshold until the pressure in the accumulator becomes greater than or equal to the pressure threshold.

9. The control system of claim 6 further comprising:
   a second valve in fluid communication with the first cylinder; and
   a pressure storage module that selectively controls the second valve to maintain a pressure of air in the accumulator from the first cylinder.

10. The control system of claim 9, wherein the second valve is at least one of a passive check valve and an active control valve.

11. The control system of claim 6, wherein the first valve is an active control valve.

12. A vehicle comprising:
   an engine having a plurality of cylinders;
   an accumulator in fluid communication with a first cylinder of the plurality of cylinders, the accumulator for storing air;
   a first valve disposed between the first cylinder and the accumulator; and a control module that starts the engine by controlling the first valve to release the stored air to the first cylinder that is stopped in an expansion stroke in order to push the first cylinder until a second cylinder that is a next available cylinder to fire is fired and by controlling fuel and spark to the second cylinder of the engine during a compression stroke of the second cylinder while releasing the stored air to the first cylinder in order to fire the second cylinder.

13. The vehicle of claim 12, wherein the engine has four cylinders, wherein the first cylinder is a first position cylinder and the second cylinder is a third position cylinder.

14. The vehicle of claim 12, wherein the control module controls the first valve to release the stored air to the first cylinder only.

15. The vehicle of claim 14, wherein the control module controls the engine to stop the first cylinder in the expansion stroke.

16. The vehicle of claim 14 further comprising a second valve disposed between the first cylinder and the accumulator, wherein the second valve controls the pressure of air in the accumulator.

17. The vehicle of claim 16, wherein the second valve is at least one of a passive check valve and an active control valve.

18. The vehicle of claim 14, wherein the first valve is an active control valve.

19. The vehicle of claim 12 further comprising a starter motor, wherein the control module starts the engine by controlling the first valve when a pressure in the accumulator is greater than or equal to a pressure threshold, wherein the control module starts the engine by controlling the starter motor when the pressure in the accumulator is less than the pressure threshold.

* * * * *